United States Patent Office 2,719,257
Patented Sept. 27, 1955

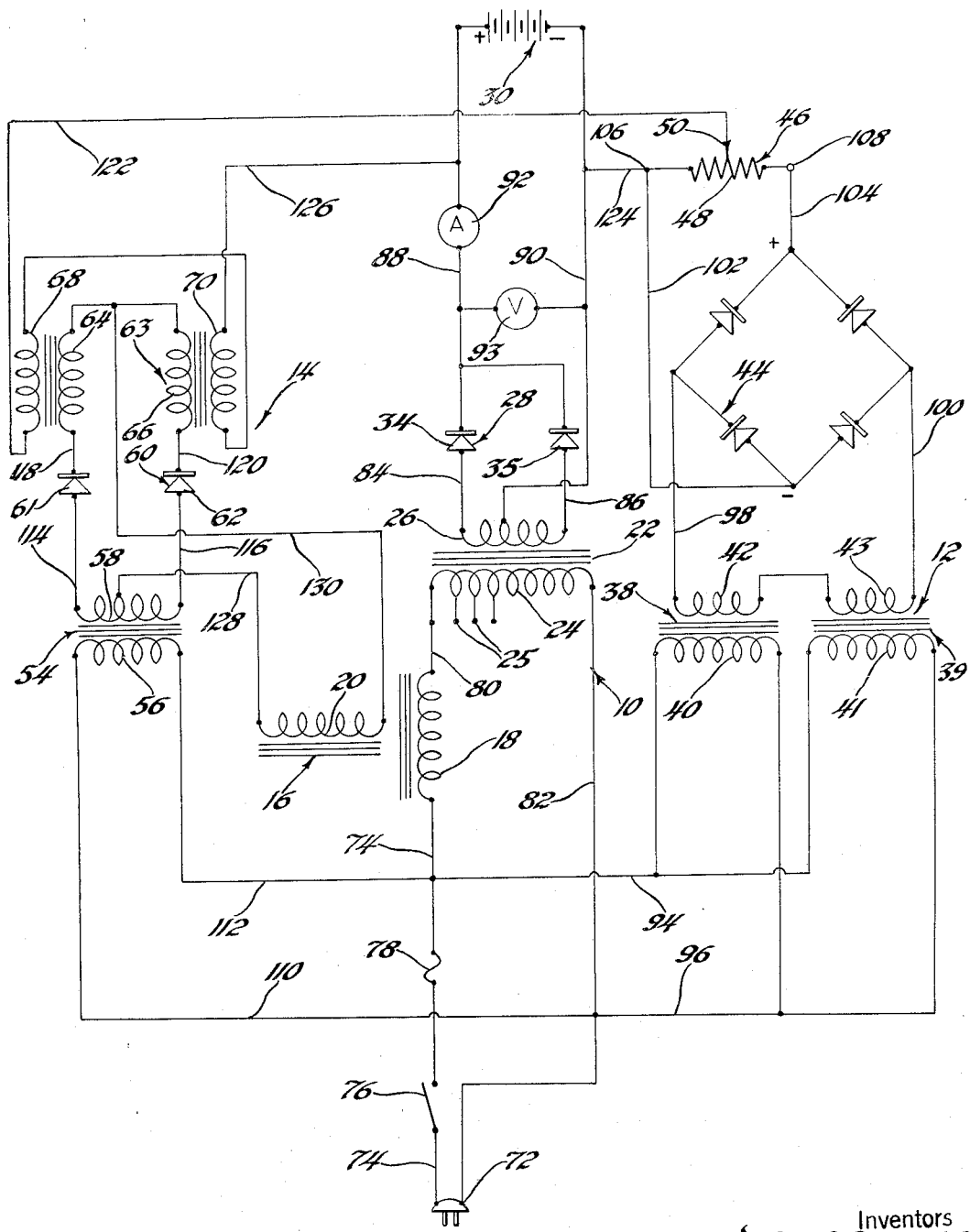

2,719,257

RECTIFIED CURRENT SUPPLY SYSTEM

Walter E. Sargeant, Huntington Woods, Mich., and Wesley S. Erwin, deceased, late of Detroit, Mich., by Kathrine S. Erwin, administratrix, Birmingham, Mich., assignors to General Motors Corporation, Detroit, Mich., a corporation of Delaware Application August 12, 1952, Serial No. 304,042

6 Claims. (Cl. 321—18)

This invention relates to rectified current supply systems for supplying a closely regulated output to a variable load and, more particularly, to a regulated battery charging system especially suited for use as a car-equivalent ignition source for dynamometer testing of internal combustion engines.

In order to ascertain more accurately the performance characteristics of vehicle engines during chassis dynamometer tests thereof, it is customary to disconnect the accessory apparatus driven by the engine, including the electrical generator. The generator serves, of course, to supply electrical energy to the electrically operated devices of the vehicle including the engine ignition system and to keep the vehicle storage battery charged when the engine is running. With the generator disconnected, there is created the problem of providing a car-equivalent ignition source. To supply the ignition system from the storage battery alone would not be satisfactory as the battery voltage would vary considerably with variations in speed of the engine and would decrease appreciably as the battery rapidly approaches a discharged condition.

An equivalent ignition source should maintain the system voltage at, say, between 7.2 to 7.4 volts while the engine is running and should be of sufficiently low source impedance to maintain this voltage during the short ignition pulse currents. Only batteries thus far have been found to satisfy such impedance requirements. Rectifier type systems employed in lieu of both the generator and battery for these purposes have been found to lack sufficiently close regulation characteristics and necessarily would be of large capacity and costly.

Accordingly, the present invention has among its objectives to provide a Rectified Current Supply System suitable for the aforementioned and allied purposes and possessed of a low equivalent source impedance, a sufficiently close regulation characteristic, and low cost and maintenance factors.

For the accomplishment of the above ends the present invention provides a rectified current supply system which simulates the generator in a car and which, when employed in combination with the vehicle storage battery, serves as a car-equivalent ignition source. The invention may be employed as a battery charging system alone and, in its broader aspects, as a rectified current supply system for supplying a closely regulated output to a variable load substantially independent of A. C. power line variations and of the demands of the load.

In accordance with the invention there is provided a charging current or main supply path which includes a variable impedance in the form of a saturable reactor connected in series with an A. C. power line to a rectifier whose output is supplied to a battery and/or load. The output of the rectifier is compared in magnitude with a stabilized D. C. reference voltage supplied from a reference circuit path connected to the A. C. power line. The difference between these two D. C. voltages is applied to the input of a control circuit path which includes suitable power amplifying means preferably in the form of a magnetic amplifier, also energized from the power line. The output of the magnetic amplifier is applied to the D. C. control winding of the saturable reactor in the main supply path. Deviations of the output voltage of the main supply path from the reference voltage due to power line variations or changes in load will vary the output of the magnetic amplifier and produce a compensating change in the A. C. voltage applied to the rectifier so as to maintain the rectified output thereof substantially constant.

The above and other objects, features and advantages attending the invention will appear more fully from the following detailed description and schematic circuit representation of the invention which comprises a charging current or main supply path 10, a reference circuit path 12 and a control circuit path 14.

The main supply path 10 includes a variable impedance device in the form of a saturable reactor 16 having an A. C. winding 18 and a D. C. control winding 20, a power transformer 22 having a primary winding 24 and a secondary winding 26, a full-wave rectifier 28, and a storage battery 30. The saturable reactor 16 is wound on a core which may be of the closed three-legged variety with approximately 320 turns of #20 copper wire on each of the coils forming the A. C. winding thereof on the outer legs of the core and with 640 turns of #20 copper wire on the D. C. control winding on the center leg of the core.

The transformer 22 may be a 120 to 24 volt step-down power transformer provided with taps as 25 on the primary winding 24 to accommodate different supply source voltages and a center-tapped secondary winding 26. The rectifier 28 is of the dry variety with selenium type elements 34, 35 connected to provide full-wave rectification and has a low output resistance of approximately 0.42 ohm.

The reference circuit path 12 is shown as including a pair of constant voltage transformers 38 and 39, only the primary windings 40 and 41 and secondary windings 42 and 43, respectively, of which are shown, and a small auxiliary rectifier consisting of a dry full-wave bridge rectifier 44 the output of which is taken across a potentiometer 46 comprising a resistance 48 and adjustable tap 50. The constant voltage transformers 38 and 39 are of the type well known in the art and function as effective voltage stibilizing means to maintain the energizing voltage supplied to the bridge rectifier 44 and, therefore, the D. C. output of the latter substantially constant and independent of load changes and power line voltage variations.

The control circuit path 14 includes a magnetic amplifier which may be of the well known self-saturated variety and comprises a 120 to 80 volt step-down power transformer 54 having a primary winding 56 and a center-tapped secondary winding 58, a full-wave dry type rectifier 60 composed of a pair of selenium elements 61, 62 and a standard commercially available saturable reactor 63 the A. C. or variable impedance power winding of which is formed by the coils 64 and 66 and the input or control winding by the oppositely connected coils 68 and 70, substantially as shown.

The main supply path 10 is energized from a convenient 115 volt A. C. power outlet through a plug 72 one side of which is connected through a conductor 74 having a switch 76 and fuse 78 in series therewith to one side of the A. C. winding 18 of the saturable reactor 16. The other side of the reactor winding 18 is serially connected by conductor 80 to the high potential side of the primary winding 24 of the power transformer 22 the low potential side of which is connected through conductor 82 back to the other side of the plug 72 and the A. C. power line. The opposite terminals of the transformer secondary winding 26 are connected over conductors 84 and 86 to one side of the rectifier elements 34 and 35, respectively, the opposite sides of which are each connected to conductor 88 leading to the positive terminal of the battery 30 the negative terminal of which is connected over conductor 90 to the center of the secondary winding 26 of the main circuit power transformer 22. The load or ignition terminals are connected across the battery. A 0–25A ammeter 92 is connected in conductor 88 and a 0–10–V voltmeter 93 is connected across conductors 88 and 90 for metering the output current and voltage of the system.

The reference circuit path 12 is connected by conductors 94 and 96 to conductors 74 and 82, respectively, to receive energy from the A. C. power source for energizing the parallel connected primary windings 40 and 41 of the constant voltage transformers 38 and 39, the series connected secondary windings 42 and 43 of which are connected by conductors 98 and 100 to diagonally opposed terminals of the rectifier bridge 44, as shown. The conjugate terminals of the bridge are connected by conductors 102 and 104 to the terminals 106 and 108 of the potentiometer resistor 48.

The control circuit path 14 is connected by conductors 110 and 112 to conductors 74 and 82, respectively, to receive A. C. power to energize the primary 56 of the control circuit power transformer 54, the opposite terminals of the secondary winding 58 of which are connected by conductors 114 and 116 to one side of respective ones of the rectifier elements 61 and 62 and then by conductors 118 to 120 to opposite terminals of the power windings 64 and 66 of the saturable reactor 63 of the magnetic amplifier control unit. The differentially connected control windings 68 and 70, forming the input circuit of the reactor 63 and the magnetic amplifier, are connected in a circuit that may be traced from one side of winding 68, conductor 122 to the adjustable tap 50 of the potentiometer 46, the portion of the potentiometer resistance 48 between tap 50 and terminal 106, conductor 124 to conductor 90 connected to the negative side of the battery 30 and/or load, through the battery and conductor 126 from the positive side of the battery back to the free side of winding 70. The output of the magnetic amplifier is taken over conductors 128 and 130 connected, respectively, to the center of the tapped secondary winding 58 of the transformer 54 and the center or junction of the power windings 64 and 66 of reactor 63, and to the opposite sides of the D. C. control winding 20 of the saturable reactor 16, substantially as shown.

In operating the above apparatus as a car-equivalent ignition source, the output of the main supply path is set at, say, approximately 7.2 volts to supply at no load a floating charge of 1 or 2 amperes to a substantially fully charged battery and to supply the necessary energy to the engine ignition system connected as a load across the battery terminals. The output of the reference circuit path 12 is adjusted by potentiometer 46 to supply at no load a stabilized D. C. reference voltage of about 7.0 volts, approximately 0.2 volt below the no-load output voltage from the main circuit rectifier 28. The potential outputs of the main supply path 10 and reference circuit path 12 are combined differentially, as may be ascertained from the polarities indicated on the drawing, and are supplied over the conductors 122 and 126 as a differential control voltage to the input circuit of the magnetic amplifier. The magnetic amplifier has a load current versus input control voltage characteristic such that a change in the input or control voltage applied thereto is accompanied by a proportionate and opposite change in the load or output current therefrom over a substantial portion of its operating range of input voltage values.

Thus, if the output voltage of the main supply path 10 should tend to decrease as a result of increased current demand of the load or a decrease in the A. C. power line voltage, the control voltage applied to the input of the magnetic amplifier will tend to decrease, thereby increasing the current output thereof supplied to the control winding 20 of the saturable reactor 16 so as to saturate the latter. The reactor 16 is connected so as to decrease its reactive voltage drop appearing across the A. C. winding 18 thereof when the reactor is in a saturated condition. The voltage available for energization of the power transformer 22 and, therefore, the rectifier 28 will be increased correspondingly to increase the rectifier output and compensate for the aforementioned output voltage reduction. The system operates in an opposite manner when the output voltage increases due to a reduction in load or an increase in power line voltage. By reason of the stabilizing effect of the constant voltage transformers of the reference circuit path, variations in power line voltage as great as plus or minus 15 to 20 volts have little effect on the voltage regulating characteristics of the system. Tests on this circuit have indicated it to hold battery voltage within slightly less than 0.2 volt from zero to ten amperes of charging current.

As a battery charger the apparatus is capable of bringing battery voltage up to operating voltage in less than an hour on a dead storage battery.

There is thus provided a simple and efficient rectified current supply system which does not employ any moving parts or thermionic vacuum tubes, which possesses a low equivalent source impedance and which is entirely automatic or self-adjusting and possessed of a closely regulated output characteristic. It is to be understood that the above described arrangement is but illustrative of the application of the principles of the invention and that numerous other arrangements may be readily devised by those skilled in the art which will embody the principles of the invention and fall within the spirit and scope thereof.

We claim:

1. In combination, a source of A. C. voltage, a main supply path including rectifying means having an input circuit energized from said A. C. source, a saturable reactor having an A. C. winding connected in series with the input circuit of said rectifying means and a D. C. control winding, a reference circuit path including voltage stabilizing means and auxiliary rectifying means connected to said A. C. source for deriving a substantially constant D. C. reference voltage therefrom, and a control circuit path including magnetic amplifying means having an input control circuit connected to receive the difference between the output voltages of said main supply path and said reference circuit path and an output circuit connected to the said D. C. control winding of said saturable reactor.

2. A rectified current supply system including magnetic control means for regulating the output voltage thereof comprising, in combination, a source of A. C. voltage, a main supply path including a transformer having a primary winding energized from said A. C. source and a secondary winding, rectifying means connected to the said secondary of said transformer, a saturable reactor having an A. C. winding connected in series with the said transformer primary winding and a D. C. control winding, a reference circuit path including constant voltage transformer means having a primary winding connected to said A. C. source and a secondary winding, auxiliary rectifying means connected to the said secondary winding of said constant voltage transformer, and a control circuit path including magnetic amplifier means providing a D. C. output voltage to the said D. C. control winding of said saturable reactor, said magnetic amplifier means having an input control winding conductively connected to receive the difference between the output voltages of said main supply path and said reference circuit path and a power winding including separate rectifying means connected thereto for energization from said A. C. source.

3. A rectified current supply system including magnetic control means for regulating the output voltage thereof and comprising, in combination, a source of A. C. voltage, a main supply path including a transformer having a primary winding energized from said A. C. source and a secondary winding, rectifying means connected to the said secondary winding of said transformer, a saturable reactor having an A. C. winding connected in series with the said transformer primary winding and a D. C. control winding, a reference circuit path including voltage stabilizing means connected to said A. C. source and auxiliary rectifying means connected to said voltage stabilizing means, and a control circuit path including magnetic power amplifying means; said magnetic power amplifying means including a pair of differentially connected input control windings, a pair of serially connected power windings each associated with a respective one of said control windings, a balanced rectifier circuit, said balanced rectifier circuit including a transformer having a primary winding connected to said A. C. source and a center-tapped secondary winding and a pair of rectifiers connected from said transformer secondary winding to said power windings for supplying a rectified voltage thereto, said input control windings of said magnetic amplifier means being connected to receive the difference between the output voltages of said main supply path and the said reference circuit path, and said D. C. control winding of said saturable reactor being connected to a point between the said power windings and to the center-tap of the secondary winding of said transformer of said magnetic power amplifying means.

4. In a rectified current supply system adapted to be energized from an A. C. source and furnishing a self-regulated D. C. supply voltage to a variable load, said system including a main supply path having an input circuit energized from said A. C. source and an output circuit connected to said load, said main supply path including a saturable reactor having an A. C. winding in the input circuit of said main supply path and rectifying means between the said A. C. winding of said reactor and the said load furnishing a D. C. output voltage thereto, said saturable reactor also having a D. C. control winding, a reference circuit path including voltage stabilizing means connected to said A. C. source and auxiliary rectifying means connected to the said voltage stabilizing means for deriving a substantially constant D. C. reference output voltage from said A. C. source, and a control circuit path including a self-saturated magnetic power amplifying means therein, said magnetic power amplifying means having an input control circuit connected to receive the difference between the output voltages from said main supply path and said reference circuit path and an output circuit connected to the said D. C. control winding of said saturable reactor.

5. In a rectified current supply system adapted to be energized from an A. C. source and furnishing a self-regulated D. C. supply to a variable load, said system including main rectifying means connected between said source and said load and furnishing a D. C. output voltage thereto, a saturable reactor having a variable impedance winding and a D. C. control winding with said variable impedance winding connected between said source and said main rectifying means, auxiliary rectifying means including voltage stabilizing means connected to said A. C. source and furnishing a regulated D. C. output reference voltage therefrom, circuit means connected to the output of said main rectifying means and said auxiliary rectifying means differentially combining the said output voltages thereof, and control means receiving a differential control voltage from said differential circuit combining means and supplying said control voltage to the said control winding of said saturable reactor; said control means including magnetic power amplifying means through which said control voltage is applied to said control winding of said saturable reactor.

6. In a rectified current supply system adapted to be energized from an A. C. source and furnishing a self-regulated D. C. supply to a variable load, said system including main rectifying means connected between said source and said load and furnishing a D. C. output voltage thereto, a saturable reactor having a variable impedance winding and a D. C. control winding with said variable impedance winding connected between said source and said main rectifying means, auxiliary rectifying means including voltage stabilizing means connected to said A. C. source and furnishing a regulated D. C. output reference voltage theerfrom, circuit means connected to the output of said main rectifying means and said auxiliary rectifying means differentially combining the said output voltages thereof, and control means receiving a differential control voltage from said differential circuit combining means and supplying said control voltage to the said control winding of said saturable reactor; said control means including self-saturated magnetic power amplifying means powered from said A. C. source through separate rectifying means between said A. C. source and said magnetic amplifying means, said differential control voltage being applied to the said D. C. control winding of said saturable reactor through said magnetic amplifying means.

References Cited in the file of this patent

UNITED STATES PATENTS

| | | |
|---|---|---|
| 2,511,219 | Pogorzelski | June 13, 1950 |
| 2,563,486 | Potter | Aug. 7, 1951 |